(12) United States Patent
Zhou et al.

(10) Patent No.: US 12,034,609 B2
(45) Date of Patent: Jul. 9, 2024

(54) METHODS AND APPARATUSES FOR INSTANTIATION OF NS OR VNF

(71) Applicant: Telefonaktiebolaget LM Ericsson (publ), Stockholm (SE)

(72) Inventors: Ping Zhou, Shanghai (CN); Magnus Björkqvist, Gothenburg (SE); Oktávián Klaudiusz Papp, Tinnye (HU); Arturo Martin De Nicolas, Brussels (BE); Rajavarma Bhyrraju, Athlone (IE); Cristina Badulescu, Roxboro (CA)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 18/249,541

(22) PCT Filed: Oct. 27, 2021

(86) PCT No.: PCT/CN2021/126774
§ 371 (c)(1),
(2) Date: Apr. 18, 2023

(87) PCT Pub. No.: WO2022/089491
PCT Pub. Date: May 5, 2022

(65) Prior Publication Data
US 2023/0412473 A1  Dec. 21, 2023

(30) Foreign Application Priority Data
Oct. 28, 2020  (WO) ................ PCT/CN2020/124459

(51) Int. Cl.
*H04L 41/40* (2022.01)
*H04L 41/0806* (2022.01)
*H04L 41/5041* (2022.01)

(52) U.S. Cl.
CPC .......... *H04L 41/40* (2022.05); *H04L 41/0806* (2013.01); *H04L 41/5041* (2013.01)

(58) Field of Classification Search
CPC ............................ H04L 41/40; H04L 41/0806
See application file for complete search history.

(56) References Cited

U.S. PATENT DOCUMENTS 9,641,404 B1 * 5/2017 Bailey ................. G06F 11/3409
10,469,317 B1 * 11/2019 Jiang ..................... H04L 41/082
(Continued)

FOREIGN PATENT DOCUMENTS

| CN | 106537842 A | 3/2017 |
| CN | 106685784 A | 5/2017 |

(Continued)

OTHER PUBLICATIONS

International Search Report and Written Opinion for Application No. PCT/CN2021/126774, dated Jan. 19, 2022, 10 pages.
(Continued)

*Primary Examiner* — Tonia L Dollinger
*Assistant Examiner* — Linh T. Nguyen
(74) *Attorney, Agent, or Firm* — Nicholson De Vos Webster & Elliott LLP

(57) ABSTRACT

Methods and apparatuses for instantiation of network service (NS) or virtualized network function (VNF) are disclosed. A virtualized network function manager (VNFM) receives, from a first network management entity, a first request for instantiating or changing a VNF instance. The first request comprises scaling information for at least one scalable VNF deployment unit (VDU) included in the VNF instance. The VNFM instantiates or changes the VNF instance based on the scaling information.

17 Claims, 9 Drawing Sheets

(56) References Cited

U.S. PATENT DOCUMENTS

| | | | |
|---|---|---|---|
| 11,442,756 B2* | 9/2022 | Wang | G06F 9/5077 |
| 11,489,873 B2* | 11/2022 | Lin | H04L 67/10 |
| 2016/0315802 A1* | 10/2016 | Wei | H04L 67/55 |
| 2017/0244596 A1* | 8/2017 | Chen | H04L 41/0803 |
| 2017/0302543 A1* | 10/2017 | Wu | H04L 43/08 |
| 2018/0375726 A1* | 12/2018 | Xia | H04L 43/20 |
| 2019/0146827 A1* | 5/2019 | Yu | H04L 41/0816 709/226 |
| 2020/0012510 A1 | 1/2020 | Andrianov et al. | |
| 2020/0084107 A1* | 3/2020 | Li | H04L 65/40 |
| 2021/0037400 A1* | 2/2021 | Yao | H04W 24/04 |
| 2021/0149699 A1* | 5/2021 | Celozzi | G06F 11/076 |
| 2021/0342178 A1* | 11/2021 | Qin | G06F 9/5077 |
| 2022/0150122 A1* | 5/2022 | Suwi | H04L 41/5054 |
| 2022/0231908 A1* | 7/2022 | Blau | H04L 41/0895 |

FOREIGN PATENT DOCUMENTS

| | | |
|---|---|---|
| EP | 3035619 A1 | 6/2016 |
| WO | 2016197301 A1 | 12/2016 |

OTHER PUBLICATIONS

Intel, "Update of use case on VNF scaling," Nov. 14-18, 2016, 2 pages, 3GPP TSG SA WG5 (Telecom Management) Meeting #110, S5-166274, Reno, Nevada, USA.

Nokia, "Add procedure NS instance scaling," Feb. 13-17, 2017, 2 pages, 3GPP TSG SA WG5 (Telecom Management) Meeting #111bis, S5a-170054, Munich, Germany.

* cited by examiner

Send, to an NFVO, a request for instantiating an NS instance, wherein the request comprises scaling information for the NS instance included in the VNF instance — 802

FIG. 8

Receive an NSD from a network management entity, wherein the NSD comprises at least one of first scaling information indicating a first scaling level for an NS instance and second scaling information indicating a second scaling level for at least one scalable VDU included in the NS instance — 902

FIG. 9

Send an NSD to an NFVO, wherein the NSD comprises at least one of first scaling information indicating a first scaling level for an NS instance and second scaling information indicating a second scaling level for at least one scalable VDU included in the NS instance — 1002

FIG. 10

METHODS AND APPARATUSES FOR INSTANTIATION OF NS OR VNF

CROSS-REFERENCE TO RELATED APPLICATIONS

This application is a National stage of International Application No. PCT/CN2021/126774, filed Oct. 27, 2021, which claims priority to International Application No. PCT/CN2020/124459, filed Oct. 28, 2020, which are hereby incorporated by reference.

TECHNICAL FIELD

Embodiments of the disclosure generally relate to communication, and, more particularly, to methods and apparatuses for instantiation of network service (NS) or virtualized network function (VNF).

BACKGROUND

This section introduces aspects that may facilitate better understanding of the present disclosure. Accordingly, the statements of this section are to be read in this light and are not to be understood as admissions about what is in the prior art or what is not in the prior art.

European telecommunications standards institute (ETSI) network function virtualization (NFV) management and orchestration (MANO) describes the management and orchestration framework required for provisioning of virtualized network functions (VNFs) and the related operations. FIG. 1 illustrates the NFV MANO architectural framework. As shown, the framework comprises an NFV orchestrator (NFVO) 101, a VNF manager (VNFM) 102 and a virtual infrastructure manager (VIM) 103. The NFVO 101 interfaces with an operation support system (OSS)/business support system (BSS) 104. The NFVO 101 can be responsible for NFV infrastructure (NFVI) resources orchestration across multiple VIMs 103 and lifecycle management of network services. The VNFM 102 interfaces with an element manager (EM) 105 and a VNF 106. The VNFM 102 can be responsible for VNF lifecycle management. The VIM 103 interfaces with a virtualization layer 107. The VIM 103 can control and manage NFVI compute, storage and network resources.

A VNF package contains all the required files and metadata descriptors required to validate and instantiate a VNF. The deployment and operational behavior of each VNF is captured in a template called VNF descriptor (VNFD), standardized in ETSI GS NFV-IFA011. A VNFD describes a VNF in terms of deployment and operational behavior requirements. It also contains virtualized deployment units (VDUs), internal virtual link descriptors, external connection point descriptors, software image descriptors, and deployment flavor descriptors.

A topology and orchestration specification for cloud applications (TOSCA) representation of the standardized VNFD is provided in ETSI GS NFV-SOL001. Other representations of the ETSI GS IFA011 VNFD are possible. Among the ones that are standardized, there is also ETSI GS NFV-SOL006 which provides the YANG representation. The VNFD (in one of TOSCA, YANG or other languages) and VNF package are used by the NFVO/VNFM for deploying and managing the life cycle of a VNF instance.

The number of VNF component (VNFC) instances deployed for each VDU at instantiation is specified by one or more instantiation levels in the VNFD. An instantiation level describes a given amount of resources to be instantiated in terms of the number of VNFC instances to be created from each VDU and bit rate requirements. When an "Instantiate VNF" operation is triggered, one of the predefined instantiation levels is specified in InstantiateVnfRequest to deploy a VNF.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for instantiation of network service (NS) or virtualized network function (VNF). In particular, one of the problems to be solved by the disclosure is that the existing solution for instantiation of NS or VNF is not flexible.

According to a first aspect of the disclosure, there is provided a method performed by a virtualized network function manager (VNFM). The method may comprise receiving, from a first network management entity, a first request for instantiating or changing a VNF instance. The first request may comprise scaling information for at least one scalable VNF deployment unit (VDU) included in the VNF instance. The method may further comprise instantiating or changing the VNF instance based on the scaling information.

In this way, it is flexible for customer to adjust the instantiation level for scalable VDUs when instantiating a VNF instance.

In an embodiment of the disclosure, the scaling information may indicate a scaling level different from that indicated in a VNF descriptor (VNFD) of the VNF instance.

In an embodiment of the disclosure, instantiating or changing the VNF instance based on the scaling information may comprise sending, to a second network management entity, a second request for granting resources to the VNF instance. The second request may comprise the scaling information.

In an embodiment of the disclosure, the first request for instantiating a VNF instance may further indicate whether an instantiation based on the scaling information is supported by the VNF instance.

In an embodiment of the disclosure, whether an instantiation based on the scaling information is supported by the VNF instance may be indicated in an Instantiate VNF Operation Configuration.

In an embodiment of the disclosure, the scaling level indicated in the scaling information may be above zero and below a maximum scaling level indicated in the VNFD of the VNF instance.

In an embodiment of the disclosure, the scaling information may comprise: a first indicator indicating a scaling level of the VNF instance; a second indicator identifying an aspect of the scaling; and a third indicator identifying the VNFD of the VNF instance.

In an embodiment of the disclosure, the first network management entity may be a network function virtualization orchestrator (NFVO) and the second network management entity may be the NFVO.

In an embodiment of the disclosure, the first network management entity may be an element manager (EM). The second network management entity may be an NFVO.

In an embodiment of the disclosure, the first request may be an Instantiate VNF Request or a Change VNF Flavour Request.

In an embodiment of the disclosure, the second request may be a Grant Request.

According to a second aspect of the disclosure, there is provided a method performed by a network management entity. The method may comprise sending, to a VNFM, a first request for instantiating or changing a VNF instance. The first request may comprise scaling information for at least one scalable VDU included in the VNF instance.

In this way, it is flexible for customer to adjust the instantiation level for scalable VDUs when instantiating a VNF instance.

In an embodiment of the disclosure, the scaling information may indicate a scaling level different from that indicated in a VNFD of the VNF instance In an embodiment of the disclosure, the network management entity may be an EM.

In an embodiment of the disclosure, the network management entity may be an NFVO.

In an embodiment of the disclosure, the method may further comprise receiving, from the VNFM, a second request for granting resources to the VNF instance. The second request may comprise the scaling information.

In an embodiment of the disclosure, the method may further comprise determining a grant for the VNFM based on the scaling information. The method may further comprise sending the grant to the VNFM.

In an embodiment of the disclosure, the first request for instantiating a VNF instance may further indicate whether an instantiation based on the scaling information is supported by the VNF instance.

In an embodiment of the disclosure, whether an instantiation based on the scaling information is supported by the VNF instance may be indicated in an Instantiate VNF Operation Configuration.

In an embodiment of the disclosure, the scaling level indicated in the scaling information may be above zero and below a maximum scaling level indicated in the VNFD of the VNF instance.

In an embodiment of the disclosure, the scaling information may comprise: a first indicator indicating a scaling level of the VNF instance; a second indicator identifying an aspect of the scaling; and a third indicator identifying the VNFD of the VNF instance.

In an embodiment of the disclosure, the first request may be an Instantiate VNF Request or a Change VNF Flavour Request.

In an embodiment of the disclosure, the second request may be a Grant Request.

According to a third aspect of the disclosure, there is provided a method performed by a NFVO. The method may comprise receiving, from a network management entity, a request for instantiating an NS instance. The request may comprise scaling information for the NS instance. The method may further comprise instantiating the NS instance based on the scaling information.

In this way, it is possible to instantiate an NS instance to a target scale level.

In an embodiment of the disclosure, the scaling information may indicate a scaling level different from that indicated in an NS descriptor (NSD) of the NS instance.

In an embodiment of the disclosure, the scaling information may comprise: a first indicator indicating a scaling level of the NS instance; and a second indicator identifying an aspect of the scaling.

In an embodiment of the disclosure, the network management entity may be an operation support system (OSS) or a business support system (BSS).

In an embodiment of the disclosure, the request may be an Instantiate NS Request.

According to a fourth aspect of the disclosure, there is provided a method performed by a network management entity. The method may comprise sending, to an NFVO, a request for instantiating an NS instance. The request may comprise scaling information for the NS instance.

In this way, it is possible to instantiate an NS instance to a target scale level.

In an embodiment of the disclosure, the scaling information may indicate a scaling level different from that indicated in an NSD of the NS instance.

In an embodiment of the disclosure, the scaling information may comprise: a first indicator indicating a scaling level of the NS instance; and a second indicator identifying an aspect of the scaling.

In an embodiment of the disclosure, the network management entity may be an OSS or a BSS.

In an embodiment of the disclosure, the request may be an Instantiate NS Request.

According to a fifth aspect of the disclosure, there is provided a method performed by an NFVO. The method may comprise receiving an NSD from a network management entity. The NSD may comprise at least one of first scaling information indicating a first scaling level for an NS instance and second scaling information indicating a second scaling level for at least one scalable VDU included in the NS instance.

In this way, it is possible for the NFVO to know whether an instantiation based on the first and/or second scaling information is supported by the NS instance and/or VNF instance.

In an embodiment of the disclosure, the first scaling information may be included in an NS profile of the NSD.

In an embodiment of the disclosure, the second scaling information may be included in a VNF profile of the NSD.

In an embodiment of the disclosure, the first scaling information may comprise: a first indicator indicating the first scaling level for the NS instance; and a second indicator identifying an aspect of the scaling.

In an embodiment of the disclosure, the second scaling information may comprise: a third indicator indicating the second scaling level for the at least one scalable VDU; and a fourth indicator identifying an aspect of the scaling.

In an embodiment of the disclosure, the network management entity may be an OSS or a BSS.

According to a sixth aspect of the disclosure, there is provided a method performed by a network management entity. The method may comprise sending an NSD to an NFVO. The NSD may comprise at least one of first scaling information indicating a first scaling level for an NS instance and second scaling information indicating a second scaling level for at least one scalable VDU included in the NS instance.

In this way, it is possible for the NFVO to know whether an instantiation based on the first and/or second scaling information is supported by the NS instance and/or VNF instance.

In an embodiment of the disclosure, the first scaling information may be included in an NS profile of the NSD.

In an embodiment of the disclosure, the second scaling information may be included in a VNF profile of the NSD.

In an embodiment of the disclosure, the first scaling information may comprise: a first indicator indicating the first scaling level for the NS instance; and a second indicator identifying an aspect of the scaling.

In an embodiment of the disclosure, the second scaling information may comprise: a third indicator indicating the second scaling level for the at least one scalable VDU; and a fourth indicator identifying an aspect of the scaling.

In an embodiment of the disclosure, the network management entity may be an OSS or a BSS.

According to a seventh aspect of the disclosure, there is provided a VNFM. The VNFM may comprise at least one processor and at least one memory. The at least one memory may contain instructions executable by the at least one processor, whereby the VNFM may be operative to receive, from a first network management entity, a first request for instantiating or changing a VNF instance. The first request may comprise scaling information for at least one scalable VDU included in the VNF instance. The VNFM may be further operative to instantiate or change the VNF instance based on the scaling information.

In an embodiment of the disclosure, the VNFM may be operative to perform the method according to the above first aspect.

According to an eighth aspect of the disclosure, there is provided a network management entity. The network management entity may comprise at least one processor and at least one memory. The at least one memory may contain instructions executable by the at least one processor, whereby the network management entity may be operative to send, to a VNFM, a first request for instantiating or changing a VNF instance. The first request may comprise scaling information for at least one scalable VDU included in the VNF instance.

In an embodiment of the disclosure, the network management entity may be operative to perform the method according to the above second aspect.

According to a ninth aspect of the disclosure, there is provided an NFVO. The NFVO may comprise at least one processor and at least one memory. The at least one memory may contain instructions executable by the at least one processor, whereby the NFVO may be operative to receive, from a network management entity, a request for instantiating an NS instance. The request may comprise scaling information for the NS instance. The NFVO may be further operative to instantiate the NS instance based on the scaling information.

In an embodiment of the disclosure, the NFVO may be operative to perform the method according to the above third aspect.

According to a tenth aspect of the disclosure, there is provided a network management entity. The network management entity may comprise at least one processor and at least one memory. The at least one memory may contain instructions executable by the at least one processor, whereby the network management entity may be operative to send, to an NFVO, a request for instantiating an NS instance. The request may comprise scaling information for the NS instance.

In an embodiment of the disclosure, the network management entity may be operative to perform the method according to the above fourth aspect.

According to an eleventh aspect of the disclosure, there is provided an NFVO. The NFVO may comprise at least one processor and at least one memory. The at least one memory may contain instructions executable by the at least one processor, whereby the NFVO may be operative to receive an NSD from a network management entity. The NSD may comprise at least one of first scaling information indicating a first scaling level for an NS instance and second scaling information indicating a second scaling level for at least one scalable VDU included in the NS instance.

In an embodiment of the disclosure, the NFVO may be operative to perform the method according to the above fifth aspect.

According to a twelfth aspect of the disclosure, there is provided a network management entity. The network management entity may comprise at least one processor and at least one memory. The at least one memory may contain instructions executable by the at least one processor, whereby the network management entity may be operative to send an NSD to an NFVO. The NSD may comprise at least one of first scaling information indicating a first scaling level for an NS instance and second scaling information indicating a second scaling level for at least one scalable VDU included in the NS instance.

In an embodiment of the disclosure, the network management entity may be operative to perform the method according to the above sixth aspect.

According to a thirteenth aspect of the disclosure, there is provided a computer program product. The computer program product may comprise instructions which when executed by at least one processor, cause the at least one processor to perform the method according to any of the above first to sixth aspects.

According to a fourteenth aspect of the disclosure, there is provided a computer readable storage medium. The computer readable storage medium may comprise instructions which when executed by at least one processor, cause the at least one processor to perform the method according to any of the above first to sixth aspects.

According to a fifteenth aspect of the disclosure, there is provided a VNFM. The VNFM may comprise a reception module for receiving, from a first network management entity, a first request for instantiating or changing a VNF instance. The first request may comprise scaling information for at least one scalable VDU included in the VNF instance. The VNFM may further comprise a processing module for instantiating or changing the VNF instance based on the scaling information.

According to a sixteenth aspect of the disclosure, there is provided a network management entity. The network management entity may comprise a sending module for sending, to a VNFM, a first request for instantiating or changing a VNF instance. The first request may comprise scaling information for at least one scalable VDU included in the VNF instance.

According to a seventeenth aspect of the disclosure, there is provided an NFVO. The NFVO may comprise a reception module for receiving, from a network management entity, a request for instantiating an NS instance. The request may comprise scaling information for the NS instance. The NFVO may further comprise an instantiation module for instantiating the NS instance based on the scaling information.

According to an eighteenth aspect of the disclosure, there is provided a network management entity. The network management entity may comprise a sending module for sending, to an NFVO, a request for instantiating an NS instance. The request may comprise scaling information for the NS instance.

According to a nineteenth aspect of the disclosure, there is provided an NFVO. The NFVO may comprise a reception module for receiving an NSD from a network management entity. The NSD may comprise at least one of first scaling information indicating a first scaling level for an NS instance and second scaling information indicating a second scaling level for at least one scalable VDU included in the NS instance.

According to a twentieth aspect of the disclosure, there is provided a network management entity. The network management entity may comprise a sending module for sending an NSD to an NFVO. The NSD may comprise at least one of first scaling information indicating a first scaling level for an NS instance and second scaling information indicating a second scaling level for at least one scalable VDU included in the NS instance.

According to a twenty-first aspect of the disclosure, there is provided a method implemented in a system including a first network management entity and a VNFM. The method may comprise, at the first network management entity, sending, to the VNFM, a first request for instantiating or changing a VNF instance. The first request may comprise scaling information for at least one scalable VDU included in the VNF instance. The method may further comprise, at the VNFM, receiving, from the first network management entity, the first request for instantiating or changing the VNF instance. The method may further comprise, at the VNFM, instantiating or changing the VNF instance based on the scaling information.

According to a twenty-second aspect of the disclosure, there is provided a system comprising a first network management entity and a VNFM. The first network management entity may be configured to send, to a VNFM, a first request for instantiating or changing a VNF instance. The first request may comprise scaling information for at least one scalable VDU included in the VNF instance. The VNFM may be configured to: receive, from the first network management entity, the first request for instantiating or changing the VNF instance; and instantiate or change the VNF instance based on the scaling information.

According to a twenty-third aspect of the disclosure, there is provided a method implemented in a system including a network management entity and an NFVO. The method may comprise, at the network management entity, sending, to the NFVO, a request for instantiating an NS instance. The request may comprise scaling information for the NS instance. The method may further comprise, at the NFVO, receiving, from the network management entity, the request for instantiating the NS instance. The method may further comprise, at the NFVO, instantiating the NS instance based on the scaling information.

According to a twenty-fourth aspect of the disclosure, there is provided a system comprising a network management entity and an NFVO. The network management entity may be configured to send, to the NFVO, a request for instantiating an NS instance. The request may comprise scaling information for the NS instance. The NFVO may be configured to: receive, from the network management entity, the request for instantiating the NS instance; and instantiate the NS instance based on the scaling information.

According to a twenty-fifth aspect of the disclosure, there is provided a method implemented in a system including a network management entity and an NFVO. The method may comprise, at the network management entity, sending an NSD to the NFVO. The NSD may comprise at least one of first scaling information indicating a first scaling level for an NS instance and second scaling information indicating a second scaling level for at least one scalable VDU included in the NS instance. The method may further comprise, at the NFVO, receiving the NSD from the network management entity.

According to a twenty-sixth aspect of the disclosure, there is provided a system comprising a network management entity and an NFVO. The network management entity may be configured to send an NSD to the NFVO. The NSD may comprise at least one of first scaling information indicating a first scaling level for an NS instance and second scaling information indicating a second scaling level for at least one scalable VDU included in the NS instance. The NFVO may be configured to receive the NSD from the network management entity.

BRIEF DESCRIPTION OF THE DRAWINGS

These and other objects, features and advantages of the disclosure will become apparent from the following detailed description of illustrative embodiments thereof, which are to be read in connection with the accompanying drawings.

FIG. 8 is a diagram illustrating a method performed by a network management entity according to an embodiment of the disclosure;

FIG. 9 is a diagram illustrating a method performed by an NFVO according to an embodiment of the disclosure;

FIG. 10 is a diagram illustrating a method performed by a network management entity according to an embodiment of the disclosure;

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Figure 2:
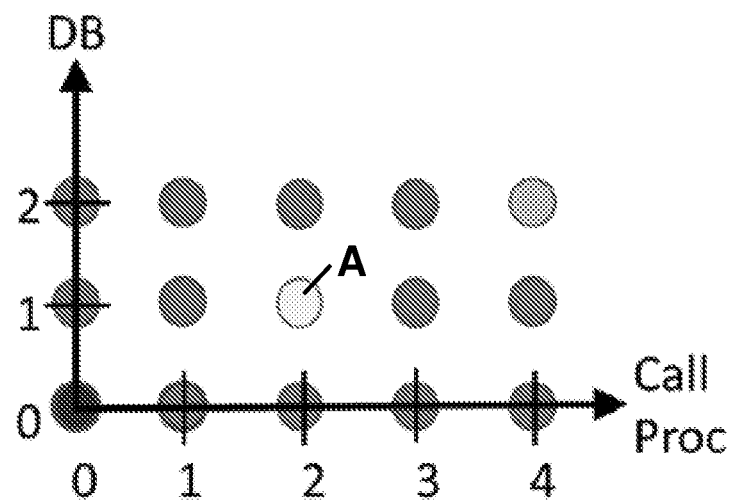
FIG. 2 is a diagram illustrating a scaling model for an example VNF.

A VNF instance can also be scaled to a target size in one "Scale VNF to Level" operation. The target size can be expressed by one of the instantiation levels pre-defined in the VNFD, or by "ScaleInfo" which is the target scale level for each scaling aspect. FIG. 2 illustrates the scaling model for an example VNF. Using the scaling model, the point A represents the tuple (DB=1, CallProc=2), i.e. one scaling step has been applied to the "DB" aspect and two scaling steps have been applied to the "CallProc" aspect. The term "DB" refers to database and the term "CallProc" refers to call processing. The example "scaleInfo" of the point A may be represented as:

```
"scaleInfo": [
{"aspectId": "DB", "scaleLevel": "1"},
{"aspectId": "CallProc", "scaleLevel": "2"}
]
```

Correspondingly, in network service (NS) level instantiation, NS instantiation level identifier (ID) is used to do instantiation.

Currently, instantiation levels are defined in VNFD, and instantiation levels must be decided when generating a VNF package. If the instantiation levels in VNFD cannot meet the requirement for a specific VNF, users have to create a new VNF package with additional instantiation levels in VNFD to deploy the new VNF. In this way, user must plan all the required instantiation levels before generating a VNF package, which is not flexible for vendors and operators.

Another alternative way is that users instantiate a new VNF with the instantiation level in VNFD first and then execute a "Scale VNF to Level" operation with the scaleInfo attribute to reach the required level. With this way, users have to run two steps one after another to reach the destination level, which creates operational overhead for operators.

In addition, the current instantiation operation has also a limitation that users can only use instantiation level for instantiation and cannot use the scale level for scalable VDUs.

Figure 1:
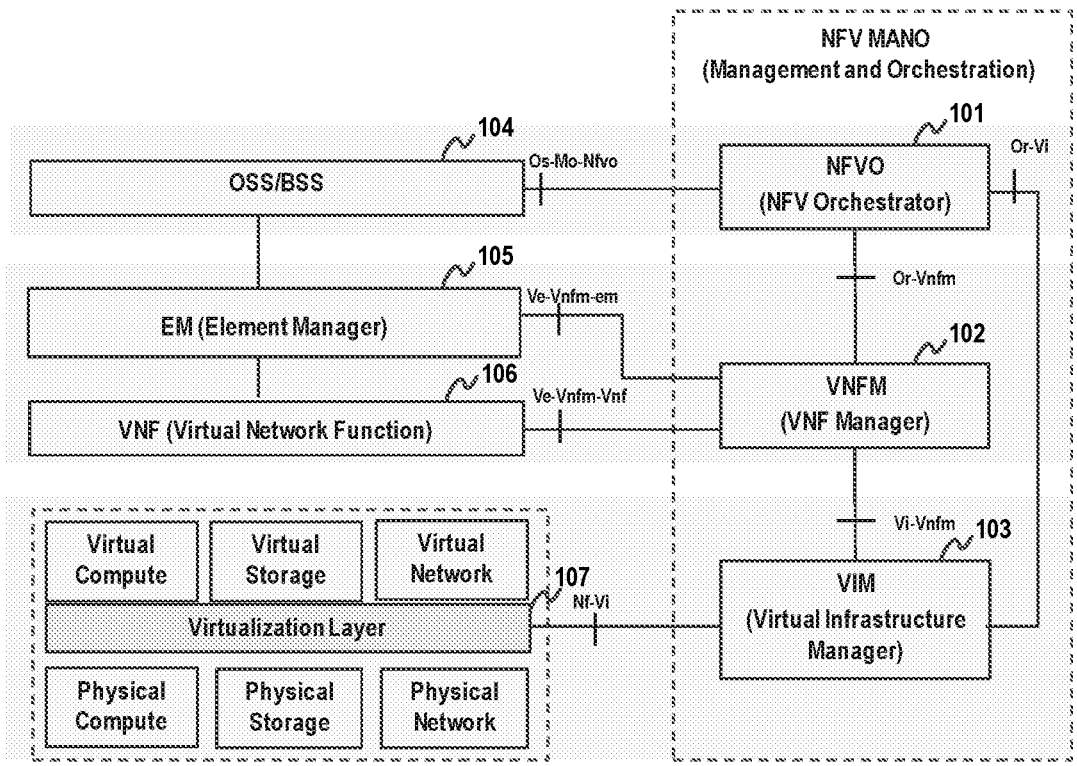
FIG. 1 is a diagram illustrating an NFV architecture.

The present disclosure proposes an improved solution for instantiation of NS or VNF. The solution may be applicable to the system shown in FIG. 1. More details of the system of FIG. 1 can be obtained from ETSI GS NFV-MAN 001 V1.1.1. Note that the specific terms used herein do not limit the present disclosure only to the system related to the specific terms, which however can be more generally applied to other systems. Also note that the network entity (or node or function) mentioned in this document may be implemented either as a network element on a dedicated hardware, as a software instance running on a dedicated hardware, or as a virtualized function instantiated on an appropriate platform, e.g. on a cloud infrastructure.

Figure 3:
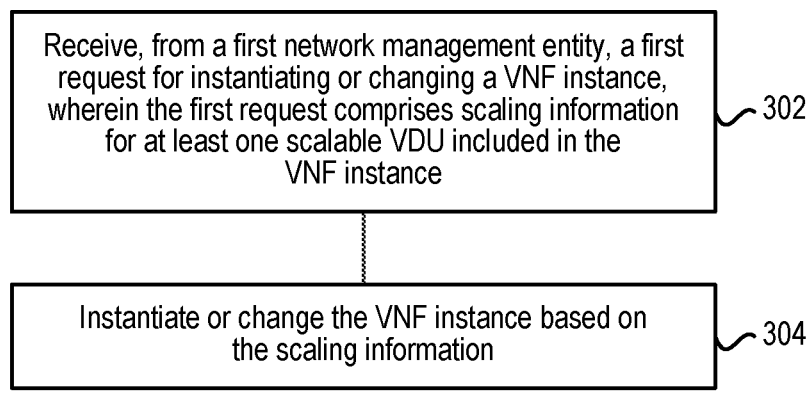
FIG. 3 is a flowchart illustrating a method performed by a VNFM according to an embodiment of the disclosure.

Hereinafter, the solution of the present disclosure will be described in detail with reference to FIGS. 3-20. FIG. 3 is a flowchart illustrating a method performed by a VNFM according to an embodiment of the disclosure. At block 302, the VNFM receives, from a first network management entity, a first request for instantiating or changing a VNF instance. The first request comprises scaling information for at least one scalable VDU included in the VNF instance. The expression of "instantiating a VNF instance" may refer to creating an instance of the VNF. The VDU may refer to a construct supporting the description of the deployment and operational behavior of a VNF component (VNFC), where the VNFC is a component in the VNF. The VDU may describe the resources needed to deploy and manage the lifecycle of a VNFC. The term "scaling" may refer to increasing or decreasing the resources in terms of aspects such as computation, storage and network. For example, scaling a VNF instance may cover "scaling out" which refers to adding additional VNFC instances to the VNF instance to increase capacity, and "scaling in" which refers to removing VNFC instances from the VNF instance to release unused capacity.

As a first option, the first network management entity may be an NFVO. As a second option, the first network management entity may be an EM. For example, the scaling information may indicate a scaling level different from that indicated in a VNFD of the VNF instance. Note that the principle of the disclosure may apply to VNFD in general, regardless of the languages in which it is represented. When scaling a VNF instance for a particular aspect, the scaling level may indicate the target amount of resources to be applied (e.g. expressed as the target number of scaling steps to be performed) in this particular aspect. The scaling level indicated in the scaling information may be above zero (i.e. greater than or equal to zero) and below a maximum scaling level indicated in the VNFD of the VNF instance (e.g. smaller than or equal to the maximum scaling level). The scaling information may comprise: a first indicator indicating a scaling level of the VNF instance; a second indicator identifying an aspect of the scaling; and a third indicator identifying the VNFD of the VNF instance.

As an exemplary example, the first request for instantiating a VNF instance may be an Instantiate VNF Request. The first request for changing a VNF instance may be a Change VNF Flavour Request. The existing information element (IE) "ScaleInfo" may be used as the scaling information contained in the first request.

Optionally, the first request for instantiating a VNF instance may further indicate whether an instantiation based on the scaling information is supported by the VNF instance. As an exemplary example, such information may be indicated in an Instantiate VNF Operation Configuration.

Figure 4:
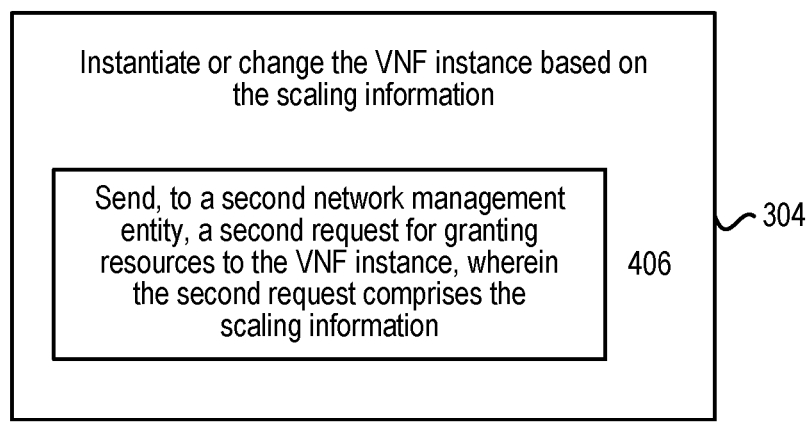
FIG. 4 is a diagram for explaining the method of FIG. 3.

At block 304, the VNFM instantiates or change the VNF instance based on the scaling information. For example, as shown in FIG. 4, block 304 may include at least block 406. At block 406, the VNFM sends, to a second network management entity, a second request for granting resources to the VNF instance. The second request comprises the scaling information. In the above first option, the second network management entity may be the NFVO. In the above second option, the second network management entity may be an NFVO. As an exemplary example, the second request may be a Grant Request. If the granting of resources is successful, the VNFM may receive a grant from the second management entity. Then the VNFM may allocate resources to a VIM to instantiate or change the VNF instance. On the other hand, if the granting of resources is not successful, the VNFM may receive a notification reporting the failure (e.g. "403 Forbidden").

With the method of FIG. 3, it is flexible for customer to adjust the instantiation level for scalable VDUs when instantiating a VNF instance. In particular, when the instantiation level for scalable VDU(s) of a new VNF instance is different from the instantiation level(s) in the VNFD, fast setup of the new VNF instance to reach the required instantiation level can be achieved by using one single operation.

Figure 5:
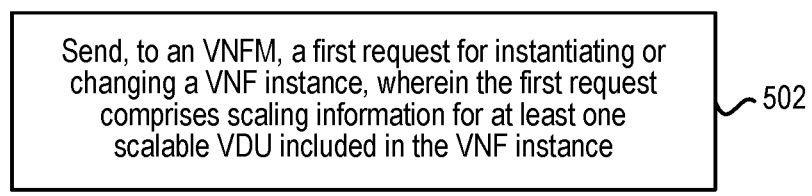
FIG. 5 is a diagram illustrating a method performed by a network management entity according to an embodiment of the disclosure.

FIG. 5 is a diagram illustrating a method performed by a network management entity according to an embodiment of the disclosure. At block 502, the network management entity sends, to a VNFM, a first request for instantiating or changing a VNF instance. The first request comprises scaling information for at least one scalable VDU included in the VNF instance. As a first option, the network management entity may be an EM. As a second option, the network management entity may be an NFVO. For example, the scaling information may indicate a scaling level different from that indicated in a VNFD of the VNF instance. The scaling level indicated in the scaling information may be above zero (i.e. greater than or equal to zero) and below a maximum scaling level indicated in the VNFD of the VNF instance (e.g. smaller than or equal to the maximum scaling level). The scaling information may comprise: a first indicator indicating a scaling level of the VNF instance; a second indicator identifying an aspect of the scaling; and a third indicator identifying the VNFD of the VNF instance.

As an exemplary example, the first request for instantiating a VNF instance may be an Instantiate VNF Request. The first request for changing a VNF instance may be a Change VNF Flavour Request. The existing information element (IE) "ScaleInfo" may be used as the scaling information contained in the first request.

Optionally, the first request for instantiating a VNF instance may further indicate whether an instantiation based on the scaling information is supported by the VNF instance. As an exemplary example, such information may be indicated in an Instantiate VNF Operation Configuration.

With the method of FIG. 5, it is flexible for customer to adjust the instantiation level for scalable VDUs when instantiating a VNF instance. In particular, when the instantiation level for scalable VDU(s) of a new VNF instance is different from the instantiation level(s) in the VNFD, fast setup of the new VNF instance to reach the required instantiation level can be achieved by using one single operation.

Figure 6:
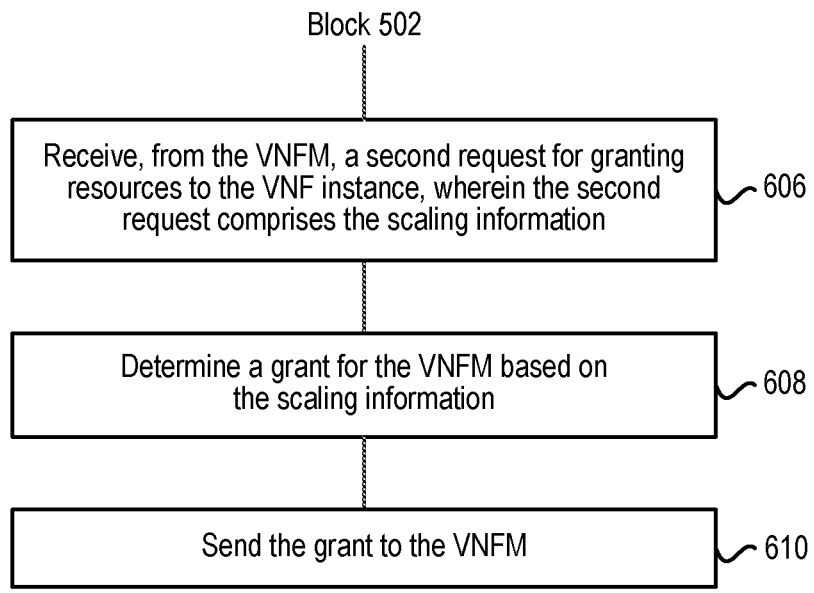
FIG. 6 is a diagram illustrating a method performed by a network management entity according to another embodiment of the disclosure.

FIG. 6 is a diagram illustrating a method performed by a network management entity according to another embodiment of the disclosure. This method is applicable to the above second option where the network management entity may be an NFVO. As shown, the method comprises block 502 described above and blocks 606-610. At block 502, the network management entity sends, to a VNFM, a first request for instantiating or changing a VNF instance. The first request comprises scaling information for at least one scalable VDU included in the VNF instance. At block 606, the network management entity receives, from the VNFM, a second request for granting resources to the VNF instance. The second request comprises the scaling information. As an exemplary example, the second request may be a Grant Request.

At block 608, the network management entity determines a grant for the VNFM based on the scaling information. That is, compared with the existing grant decision making, the scaling level indicated in the scaling information may be additionally considered. At block 610, the network management entity sends the grant to the VNFM. Since the granting of resources may be not successful as mentioned above (in that case, the VNFM may receive a notification reporting the failure), blocks 608-610 may be optional blocks. Thus, at least one embodiment of the disclosure provides a method comprising blocks 502 and 606.

Figure 7:
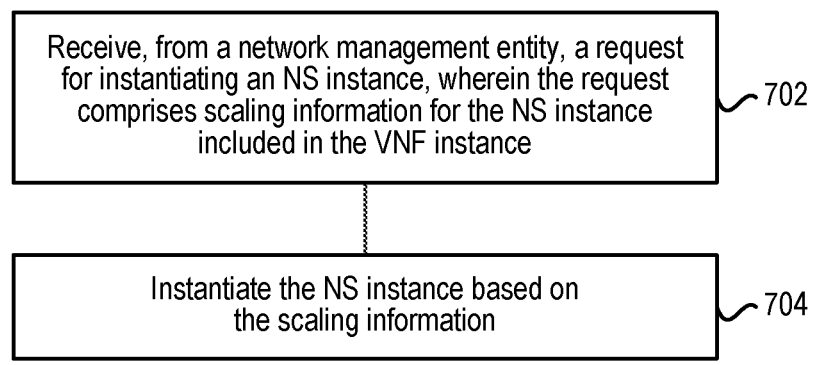
FIG. 7 is a diagram illustrating a method performed by an NFVO according to an embodiment of the disclosure.

FIG. 7 is a diagram illustrating a method performed by an NFVO according to an embodiment of the disclosure. At block 702, the NFVO receives, from a network management entity, a request for instantiating an NS instance. The request comprises scaling information for the NS instance. For example, the network management entity may be an OSS or a BSS. Similar to the scaling information for VNF instantiation, the scaling information for the NS instance may indicate a scaling level different from that indicated in an NSD of the NS instance. The scaling information may comprise: a first indicator indicating a scaling level of the NS instance; and a second indicator identifying an aspect of the scaling. As an exemplary example, the request may be an Instantiate NS Request. The existing IE "nsScaleInfo" may be used as the scaling information contained in the request. At block 704, the NFVO instantiate the NS instance based on the scaling information. That is, compared with the existing NS instantiation, the scaling level indicated in the scaling information may be additionally considered. With the method of FIG. 7, it is possible to instantiate an NS instance to a target scale level.

FIG. 8 is a diagram illustrating a method performed by a network management entity according to an embodiment of the disclosure. For example, the network management entity may be an OSS or a BSS. At block 802, the network management entity sends, to an NFVO, a request for instantiating an NS instance. The request comprises scaling information for the NS instance. Similar to the scaling information for VNF instantiation, the scaling information for the NS instance may indicate a scaling level different from that indicated in an NSD of the NS instance. The scaling information may comprise: a first indicator indicating a scaling level of the NS instance; and a second indicator identifying an aspect of the scaling. As an exemplary example, the request may be an Instantiate NS Request. The existing IE "nsScaleInfo" may be used as the scaling information contained in the request. With the method of FIG. 8, it is possible to instantiate an NS instance to a target scale level.

FIG. 9 is a diagram illustrating a method performed by an NFVO according to an embodiment of the disclosure. At block 902, the NFVO receives an NSD from a network management entity. The NSD comprises at least one of first scaling information indicating a first scaling level for an NS instance and second scaling information indicating a second scaling level for at least one scalable VDU included in the NS instance. For example, the network management entity may be an OSS or a BSS. The first scaling information may be included in an NS profile of the NSD and comprise: a first indicator indicating the first scaling level for the NS instance; and a second indicator identifying an aspect of the scaling. The second scaling information may be included in a VNF profile of the NSD and comprise: a third indicator indicating the second scaling level for the at least one scalable VDU; and a fourth indicator identifying an aspect of the scaling. With the method of FIG. 9, it is possible for the NFVO to know whether an instantiation based on the first and/or second scaling information is supported by the NS instance and/or VNF instance.

FIG. 10 is a diagram illustrating a method performed by a network management entity according to an embodiment of the disclosure. For example, the network management entity may be an OSS or a BSS. At block 1002, the network management entity sends an NSD to an NFVO. The NSD comprises at least one of first scaling information indicating a first scaling level for an NS instance and second scaling information indicating a second scaling level for at least one scalable VDU included in the NS instance. For example, the first scaling information may be included in an NS profile of the NSD and comprise: a first indicator indicating the first scaling level for the NS instance; and a second indicator identifying an aspect of the scaling. The second scaling information may be included in a VNF profile of the NSD and comprise: a third indicator indicating the second scaling level for the at least one scalable VDU; and a fourth indicator identifying an aspect of the scaling. With the method of FIG. 10, it is possible for the NFVO to know whether an instantiation based on the first and/or second scaling information is supported by the NS instance and/or VNF instance.

Figure 11:
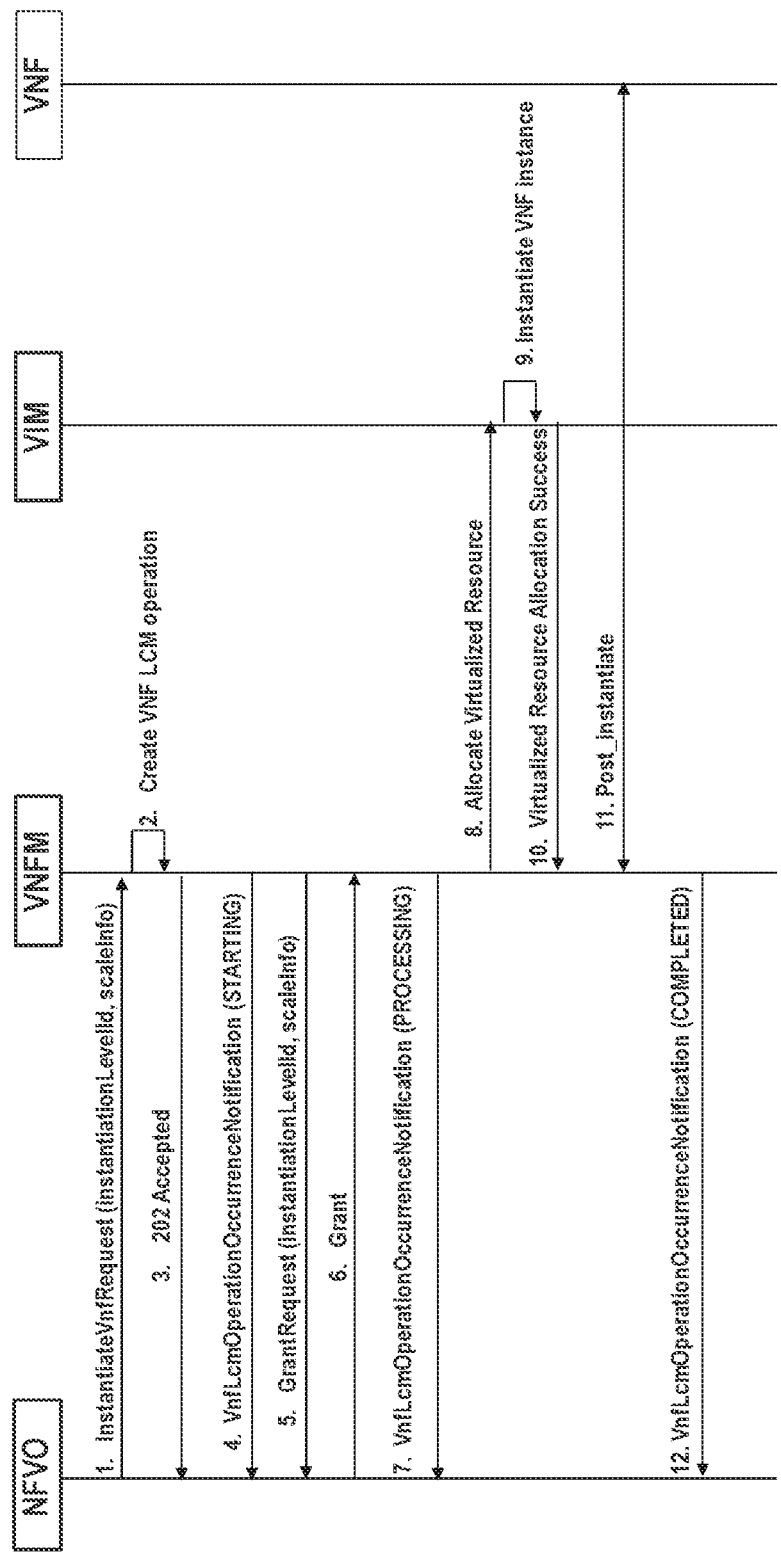
FIG. 11 is a flowchart illustrating an exemplary process according to an embodiment of the disclosure.

FIG. 11 is a flowchart illustrating an exemplary process according to an embodiment of the disclosure. This process relates to NFVO triggered Instantiate VNF life cycle management (LCM) Operation. Note that the flowchart is at high-level based on the standard ETSI NFV specifications and is used herein as an example to set the context. Thus, some slight variations in the steps or on the use of the VNFD do not affect the basic idea of the present disclosure. Even if other solutions are used and the steps are implemented in a different manner, as long as the ETSI NFV defined VNFD with the proposed modification described in the present disclosure is used, the present disclosure is applicable.

At step 1, NFVO sends InstantiateVnfRequest to VNFM. Note that ScaleInfo is specified for scalable VDUs if user requires to deploy a VNF with an instantiation level different from the ones in VNFD. At step 2, VNFM creates an individual VNF LCM operation occurrence. At step 3, VNFM sends 202 Accepted to NFVO. At step 4, VNFM sends VNF LCM operation occurrence notification to NFVO and indicate the operation enters 'STARTING' state. At step 5, VNFM sends Grant Request to NFVO to grant new resources. Note that ScaleInfo is specified for scalable VDUs if user requires to deploy a VNF with an instantiation level different from the ones in VNFD. At step 6, NFVO makes the granting decision and return Grant to VNFM. At step 7, VNFM sends VNF LCM operation occurrence notification to NFVO and indicate the operation enters 'PROCESSING' state. At step 8, VNFM requests VIM to allocate virtual resources. At step 9, VIM instantiates a VNF instance. At step 10, VIM returns virtual resource allocation success to VNFM. At step 11, VNFM executes post-instantiate action on VNF. At step 12, VNFM sends VNF LCM operation occurrence notification to NFVO and indicate the operation enters 'COMPLETED' state.

Figure 12:
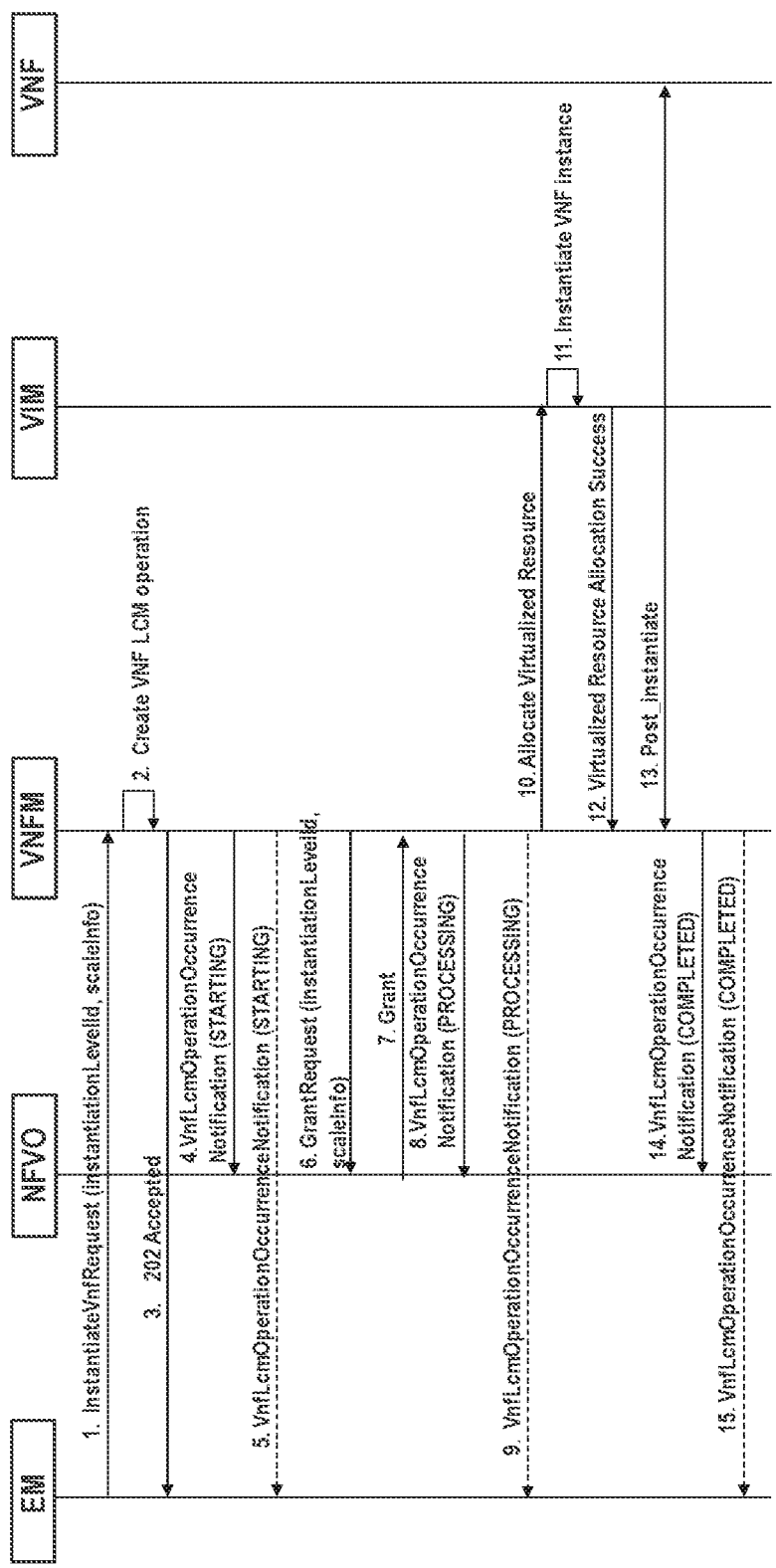
FIG. 12 is a flowchart illustrating an exemplary process according to an embodiment of the disclosure.

FIG. 12 is a flowchart illustrating an exemplary process according to an embodiment of the disclosure. This process relates to EM triggered Instantiate VNF LCM Operation with NFVO. At step 1, EM sends InstantiateVnfRequest to VNFM. Note that ScaleInfo is specified for scalable VDUs if user requires to deploy a VNF with an instantiation level different from the ones in VNFD. At step 2, VNFM creates an individual VNF LCM operation occurrence. At step 3, VNFM sends 202 Accepted to EM. At step 4, VNFM sends VNF LCM operation occurrence notification to NFVO and indicate the operation enters 'STARTING' state. At step 5, if EM subscribed notifications on VNFM, VNFM sends VNF LCM operation occurrence notification to EM and indicate the operation enters 'STARTING' state. At step 6, VNFM sends Grant Request to NFVO to grant new resources. Note that ScaleInfo is specified for scalable VDUs if user requires to deploy a VNF with an instantiation level different from the ones in VNFD. At step 7, NFVO makes the granting decision and return Grant to VNFM. At step 8, VNFM sends VNF LCM operation occurrence notification to NFVO and indicate the operation enters 'PROCESSING' state. At step 9, if EM subscribed notifications on VNFM, VNFM sends VNF LCM operation occurrence notification to EM and indicate the operation enters 'PROCESSING' state. At step 10, VNFM requests VIM to allocate virtual resources. At step 11, VIM instantiates a VNF instance. At step 12, VIM returns virtual resource allocation success to VNFM. At step 13, VNFM executes post-instantiate action on VNF. At step 14, VNFM sends VNF LCM operation occurrence notification to NFVO and indicate the operation enters 'COMPLETED' state. At step 15, if EM subscribed notifications on VNFM, VNFM sends VNF LCM operation occurrence notification to EM and indicate the operation enters 'COMPLETED' state.

Figure 13:
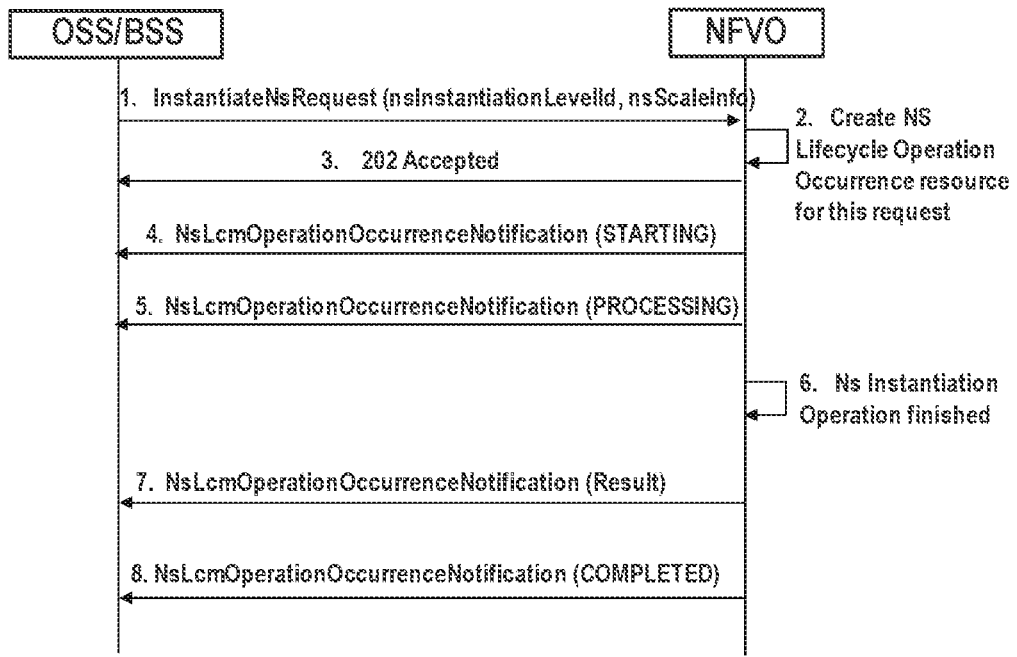
FIG. 13 is a flowchart illustrating an exemplary process according to an embodiment of the disclosure.

FIG. 13 is a flowchart illustrating an exemplary process according to an embodiment of the disclosure. This process relates to Instantiate NS LCM Operation. At step 1, OSS/BSS sends InstantiateNsRequest to NFVO. Note that nsScaleInfo is specified for a target NS scale level if user requires to deploy NS with a specific scale level. At step 2, NFVO creates an individual NS Lifecycle operation occurrence. At step 3, NFVO sends 202 Accepted to OSS/BSS. At step 4, NFVO sends NS LCM operation occurrence notification to OSS/BSS and indicate the operation enters 'STARTING' state. At step 5, NFVO sends NS LCM operation occurrence notification to OSS/BSS and indicate the operation enters 'PROCESSING' state. At step 6, NS Instantiation Operation is finished. At step 7, NFVO sends NS LCM operation occurrence notification to OSS/BSS and indicate the operation result. At step 8, NFVO sends NS LCM operation occurrence notification to OSS/BSS and indicate the operation 'COMPLETED' state.

Based on the above description, the following changes may be proposed to be made to the current technical standards. Note that the definition of the new information element (IE) in the future standard may be identical, or similar to, the proposal below. The details of the new attribute additions are described to relay the main idea of the disclosure, and are not meant to be limited to cover only these exact examples.

The Existing type "ScaleInfo" is shown blow.

TABLE 1

Existing type "ScaleInfo"

| Attribute | Qualifier | Cardinality | Content | Description |
|---|---|---|---|---|
| aspectId | M | 1 | Identifier (Reference to ScalingAspect) | Reference to the scaling aspect. |
| vnfdId | M | 0 . . . 1 | Identifier (Reference to Vnfd) | Reference to the VNFD. Shall be present in case the value differs from the vnfdId attribute of the VNF instance (e.g. during a "Change current VNF package" operation or due to its final failure). |

TABLE 1-continued

Existing type "ScaleInfo"

| Attribute | Qualifier | Cardinality | Content | Description |
|---|---|---|---|---|
| scaleLevel | M | 1 | Integer | The scale level for that aspect. Minimum value 0, maximum value maxScaleLevel as declared in the VNFD (see ETSI GS NFV-IFA 011 [3], clause 7.1.10.2.2). |

One proposal is to add attribute "scaleInfo" to the following requests: InstantiateVnfRequest; GrantRequest; and ChangeVnfFlavourRequest.

For example, new attribute scaleInfo may be added to InstantiateVnfRequest as shown below with the changes being highlighted with underlines.

TABLE 2

Instantiate VnfRequest

| Parameter | Qualifier | Cardinality | Content | Description |
|---|---|---|---|---|
| instantiationLevelId | M | 0 . . . 1 | Identifier | Identifier of the instantiation level of the DF to be instantiated. If not present, the default instantiation level as declared in the VNFD shall be instantiated. If scaleInfo is not present, instantiationLevelId is used in instantiating all VDUs. If scaleInfo is present, the scale level indicated in scaleInfo is used instead of instantiationLevelId for scalable VDUs. instantiationLevelId is used if scaleInfo is not applicable for the VDUs. |
| scaleInfo | M | 0 . . . N | ScaleInfo | This attribute is applicable for scalable VDUs. For each scaling aspect of the deployment flavour to be instantiated, the attribute specifies the VDU level to be instantiated. |
| . . . | | | | |

The Impacted standards may include IFA007 2.7.1, IFA008 2.7.1, SOL003 3.3.1, and SOL002 3.3.1.

This new attribute is used to fill in the user request the required instantiation level for scalable VDUs. This allows users to request a different instantiation level for scalable VDUs from instantiation levels in VNFD at the time of Instantiation. As shown above, the proposed solution is backward compatible, as if the "scaleInfo" is not specified and all VDUs are instantiated based on the instantiation level in the VNFD. Non-scalable VDUs are defined by instantiation levels in VNFD.

New attribute scaleInfo may be added to Grant Request as shown below with the changes being highlighted with underlines.

TABLE 3

Grant Request

| Parameter | Qualifier | Cardinality | Content | Description |
|---|---|---|---|---|
| instantiationLevelId | M | 0 . . . 1 | Identifier | If the granting request is requested for InstantiateVNF, the identifier of the instantiation level may be provided as an alternative way to define the resources to be added. This attribute shall only be used for Instantiate VNF requests. See note 2. If scaleInfo is not present, instantiationLevelId is used in instantiating all VDUs. |

TABLE 3-continued

| | | | Grant Request | |
|---|---|---|---|---|
| Parameter | Qualifier | Cardinality | Content | Description |
| scaleInfo | M | 0 . . . N | ScaleInfo | If present, this attribute is valid only for operation = INSTANTIATE. This attribute is applicable for scalable VDUs. This attribute provides an alternative way to define the resources to be added for the scalable VDUs. For each scaling aspect of the deployment flavour to be instantiated, the attribute specifies the VDU level to be instantiated. If scaleInfo is present, the scale level indicated in scaleInfo is used instead of instantiationLevelId for scalable VDUs. instantiationLevelId is used if scaleInfo is not applicable for the VDUs. |
| . . . | | | | |

The impacted standards may include IFA007 2.7.1 and SOL003 3.3.1

New attribute scaleInfo may be added to changeVnfFlavourRequest as shown below with the changes being highlighted with underlines.

TABLE 4

| | | | Change VnfFlavourRequest | |
|---|---|---|---|---|
| Parameter | Qualifier | Cardinality | Content | Description |
| instantiationLevelId | M | 0 . . . 1 | Identifier | Identifier of the instantiation level of the DF to be used. If not present, the default instantiation level as declared in the VNFD shall be used. If scaleInfo is not present, instantiationLevelId is used in instantiating all VDUs. If scaleInfo is present, the scale level indicated in scaleInfo is used instead of instantiationLevelId for scalable VDUs. instantiationLevelId is used if scaleInfo is not applicable for the VDUs. |
| scaleInfo | M | 0 . . . N | ScaleInfo | This attribute is applicable for scalable VDUs. For each scaling aspect of the deployment flavour to be instantiated, the attribute specifies the VDU level to be instantiated. |
| . . . | | | | |

The impacted standards may include IFA007 2.7.1, IFA008 2.7.1, SOL003 3.3.1, and SOL002 3.3.1. The impact on the Or-Vnfm interface (standardized in ETSI GS NFV-IFA007 and ETSI GS NFV-SOL003) is that grantRequest also can request resource grant based on 'instantiationLevelId' and 'scaleInfo' when users request a different number of scalable VDUs from the instantiation levels in VNFD.

Another proposal is to add new attribute arbitraryTargetLevelsSupported to InstantiateVnfOpConfig as shown below with the changes being highlighted with underlines.

TABLE 5

| | | | Instantiate VnfOpConfig | |
|---|---|---|---|---|
| Attribute | Qualifier | Cardinality | Content | Description |
| parameter | M | 0 . . . N | Not specified | Array of KVP requirements for VNF-specific parameters to be passed when invoking the InstantiateVnf operation. See note. |

TABLE 5-continued

Instantiate VnfOpConfig

| Attribute | Qualifier | Cardinality | Content | Description |
|---|---|---|---|---|
| arbitraryTargetLevelsSupported | M | 0...1 | Boolean | Signals whether instantiation according to the parameter "scaleInfo" is supported by this VNF. Default is FALSE, i.e. "not supported". |

The impacted standards may include IFA011 3.3.1, SOL001 2.7.1, and SOL006 3.3.1.

Yet another proposal is to add a new type ScaleInfo as shown below with the changes being highlighted with underlines.

TABLE 6 new type ScaleInfo

| Attribute | Qualifier | Cardinality | Content | Description |
|---|---|---|---|---|
| aspectId | M | 1 | Identifier (Reference to ScalingAspect) | References the scaling aspect. |
| scaleLevel | M | 1 | Integer | The scale level, greater than or equal to 0. |

NOTE:
Vertical scaling (scale up, scale down) is not supported in the present document.

Yet another proposal is to add new attribute 'scaleInfo' to VnfProfile as shown below with the changes being highlighted with underlines.

TABLE 7

VnfProfile

| Attribute | Qualifier | Cardinality | Content | Description |
|---|---|---|---|---|
| instantiationLevel | M | 0...1 | Identifier | Identifier of the instantiation level of the VNF DF to be used for instantiation. If not present, the default instantiation level as declared in the VNFD shall be used. If scaleInfo is not present, this attribute is used in instantiating all VDUs. If scaleInfo is present, the scale level indicated in scaleInfo is used instead of instantiationLevel for scalable VDUs. instantiationLevel is used if scaleInfo is not applicable for the VDUs. |
| scaleInfo | M | 0...1 | ScaleInfo | Represents for each scaling aspect of the VNF DF the scale level to be used for the instantiation. This attribute is applicable for scalable VDUs. |

The impacted standards may include IFA014 and SOL001 2.7.1.

The existing Type "NsScaleInfo" is shown below.

TABLE 8 existing Type "NsScaleInfo"

| Attribute | Qualifier | Cardinality | Content | Description |
|---|---|---|---|---|
| nsScalingAspectId | M | 1 | Identifier (Reference to NsScaling Aspect) | References the NS scaling aspect. |

TABLE 8-continued

| | existing Type "NsScaleInfo" | | | |
|---|---|---|---|---|
| Attribute | Qualifier | Cardinality | Content | Description |
| nsScaleLevelId | M | 1 | Identifier (Reference to NsLevel) | References the NS scale level. |

Yet another proposal is to add new attribute 'nsScaleInfo' to NsProfile as shown below with the changes being highlighted with underlines.

TABLE 9

| | NsProfile | | | |
|---|---|---|---|---|
| Attribute | Qualifier | Cardinality | Content | Description |
| nsInstantiationLevelId | M | 0 . . . 1 | Identifier (Reference to NsLevel) | References the NS level within the referenced NS DF to be used in the context of the parent NS instantiation. If not present, the default NS instantiation level as declared in the referenced NSD shall be used. If not present, the default instantiation level as declared in the NSD shall be used. If nsScaleInfo is not present, the NS instantiation level is used to calculate the number of instances of all VNFs or nested NSs referred in NSD. If nsScaleInfo is present, the NS instantiation level is used to calculate the number of instances of only those VNFs or nested NSs referred in NSD, for which the number of instances cannot be calculated using the information provided in nsScaleInfo. |
| nsScaleInfo | M | 0 . . . 1 | NsScaleInfo | For each NS scaling aspect of the DF applicable to this NS instance, defines the target NS scale level to which the NS instance is to be instantiated. |

The impacted standards may include IFA014 and SOL001 2.7.1.

The existing type "NsScaleInfo" is shown below.

TABLE 10

| | existing type "NsScaleInfo" | | | |
|---|---|---|---|---|
| Attribute | Qualifier | Cardinality | Content | Description |
| nsScalingAspectId | M | 1 | Identifier (Reference to NsScalingAspect) | Identifier of the NS scaling aspect. |
| nsScaleLevelId | M | 1 | Identifier (Reference to NsLevel) | Identifier of the NS scale level. |

Yet another proposal is to add attribute "NsScaleInfo" to InstantiateNsRequest. For example, new attribute NsScaleInfo may be added to InstantiateNsRequest as shown below with the changes being highlighted with underlines.

TABLE 11

| InstantiateNsRequest | | | | |
|---|---|---|---|---|
| Parameter | Qualifier | Cardinality | Content | Description |
| nsInstantiationLevelId | M | 0 ... 1 | Identifier | Identifies one of the NS instantiation levels declared in the DF applicable to this NS instance. If not present, the default NS instantiation level as declared in the NSD shall be used. If not present, the default NS instantiation level as declared in the NSD shall be used. If nsScaleInfo is not present, the NS instantiation level is used to calculate the number of instances of all VNFs or nested NSs referred in NSD. If nsScaleInfo is present, the NS instantiation level is used to calculate the number of instances of only those VNFs or nested NSs referred in NSD, for which the number of instances cannot be calculated using the information provided in nsScaleInfo. |
| nsScaleInfo | M | 0 ... N | NsScaleInfo | For each NS scaling aspect of the DF applicable to this NS instance, defines the target NS scale level to which the NS instance is to be instantiated. |
| ... | | | | |

The impacted Standards may include IFA013 and SOL005. Similar to VNF level, the principle of the disclosure is also applicable for network service level instantiation. A 'network service scale info' can be added and used to instantiate network service to a target scale level.

Figure 14:
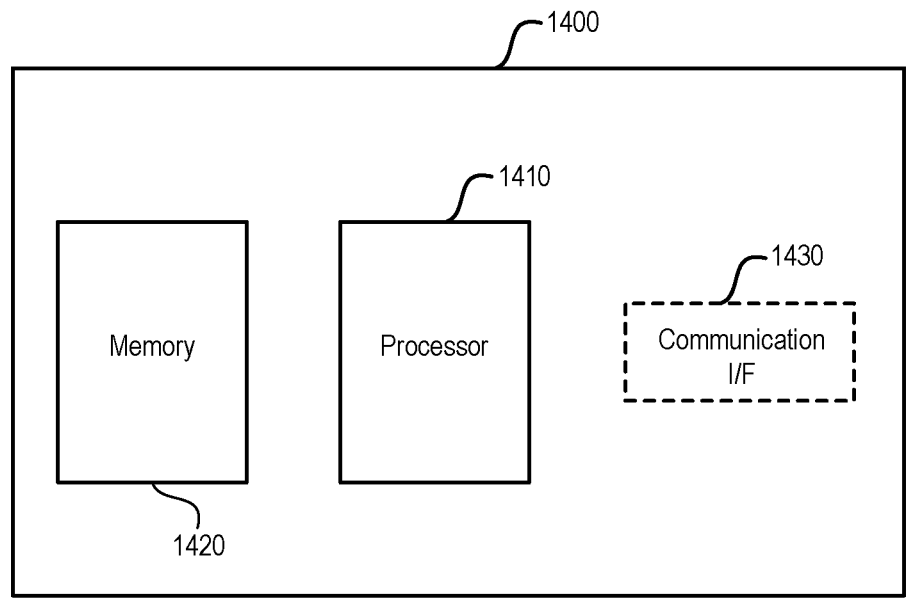
FIG. 14 is a block diagram showing an apparatus suitable for use in practicing some embodiments of the disclosure.

FIG. 14 is a block diagram showing an apparatus suitable for use in practicing some embodiments of the disclosure. For example, any one of the VNFM, the network management entity and the NFVO described above may be implemented through the apparatus 1400. As shown, the apparatus 1400 may include a processor 1410, a memory 1420 that stores a program, and optionally a communication interface 1430 for communicating data with other external devices through wired and/or wireless communication.

The program includes program instructions that, when executed by the processor 1410, enable the apparatus 1400 to operate in accordance with the embodiments of the present disclosure, as discussed above. That is, the embodiments of the present disclosure may be implemented at least in part by computer software executable by the processor 1410, or by hardware, or by a combination of software and hardware.

The memory 1420 may be of any type suitable to the local technical environment and may be implemented using any suitable data storage technology, such as semiconductor based memory devices, flash memories, magnetic memory devices and systems, optical memory devices and systems, fixed memories and removable memories. The processor 1410 may be of any type suitable to the local technical environment, and may include one or more of general purpose computers, special purpose computers, microprocessors, digital signal processors (DSPs) and processors based on multi-core processor architectures, as non-limiting examples.

Figure 15:
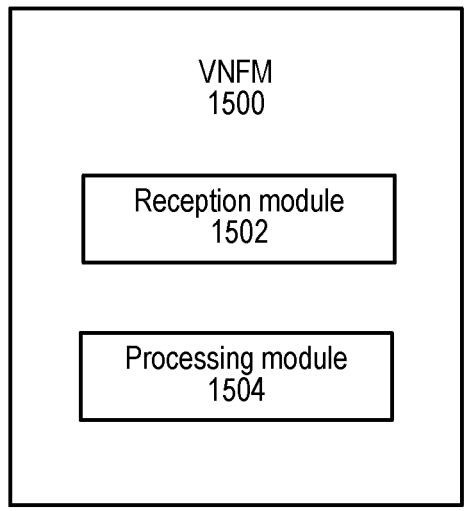
FIG. 15 is a block diagram showing a VNFM according to an embodiment of the disclosure.

FIG. 15 is a block diagram showing a VNFM according to an embodiment of the disclosure. As shown, the VNFM 1500 comprises a reception module 1502 and a processing module 1504. The reception module 1502 may be configured to receive, from a first network management entity, a first request for instantiating or changing a VNF instance, as described above with respect to block 302. The first request may comprise scaling information for at least one scalable VDU included in the VNF instance. The processing module 1504 may be configured to instantiate or change the VNF instance based on the scaling information, as described above with respect to block 304.

Figure 16:
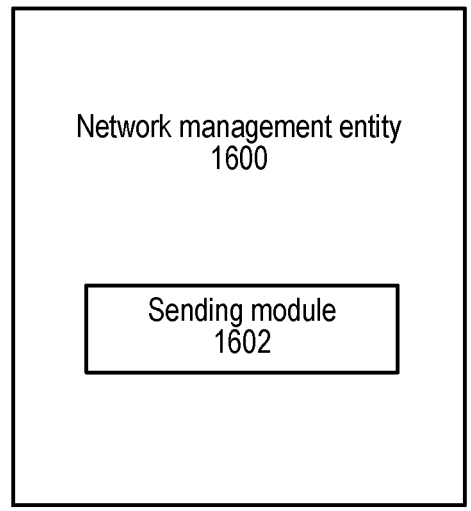
FIG. 16 is a block diagram showing a network management entity according to an embodiment of the disclosure.

FIG. 16 is a block diagram showing a network management entity according to an embodiment of the disclosure. As shown, the network management entity 1600 comprises a sending module 1602. The sending module 1604 may be configured to send, to a VNFM, a first request for instantiating or changing a VNF instance, as described above with respect to block 504. The first request may comprise scaling information for at least one scalable VDU included in the VNF instance.

Figure 17:
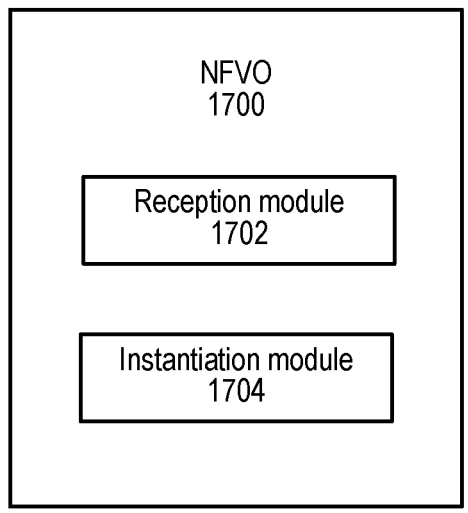
FIG. 17 is a block diagram showing an NFVO according to an embodiment of the disclosure.

FIG. 17 is a block diagram showing an NFVO according to an embodiment of the disclosure. As shown, the NFVO 1700 comprises a reception module 1702 and an instantiation module 1704. The reception module 1702 may be configured to receive, from a network management entity, a request for instantiating an NS instance, as described above with respect to block 702. The request may comprise scaling information for the NS instance. The instantiation module 1704 may be configured to instantiate the NS instance based on the scaling information, as described above with respect to block 704.

Figure 18:
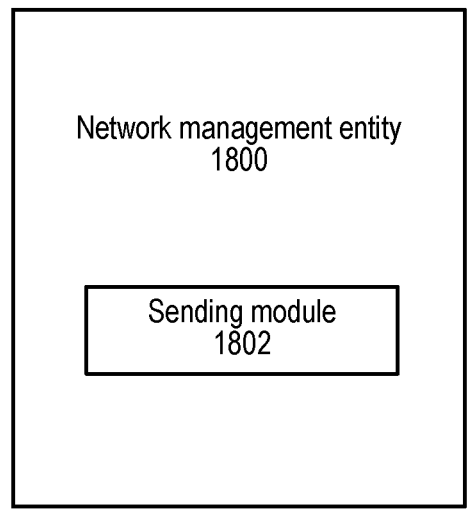
FIG. 18 is a block diagram showing a network management entity according to an embodiment of the disclosure.

FIG. 18 is a block diagram showing a network management entity according to an embodiment of the disclosure. As shown, the network management entity 1800 comprises a sending module 1802. The sending module 1802 may be configured to send, to an NFVO, a request for instantiating an NS instance, as described above with respect to block 802. The request may comprise scaling information for the NS instance.

Figure 19:
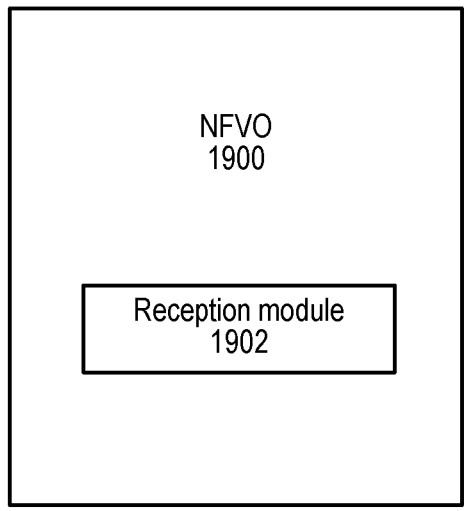
FIG. 19 is a block diagram showing an NFVO according to an embodiment of the disclosure.

FIG. 19 is a block diagram showing an NFVO according to an embodiment of the disclosure. As shown, the NFVO 1900 comprises a reception module 1902. The reception module 1902 may be configured to receive an NSD from a network management entity, as described above with respect to block 902. The NSD may comprise at least one of first scaling information indicating a first scaling level for an NS instance and second scaling information indicating a second scaling level for at least one scalable VDU included in the NS instance.

Figure 20:
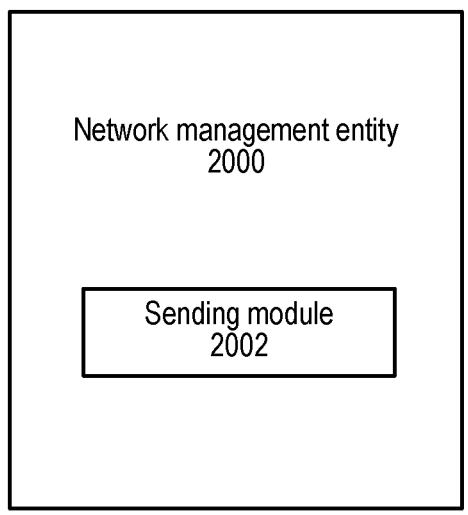
FIG. 20 is a block diagram showing a network management entity according to an embodiment of the disclosure.

FIG. 20 is a block diagram showing a network management entity according to an embodiment of the disclosure. As shown, the network management entity 2000 comprises a sending module 2002. The sending module 2002 may be configured to send an NSD to an NFVO, as described above with respect to block 1002. The NSD may comprise at least one of first scaling information indicating a first scaling level for an NS instance and second scaling information indicating a second scaling level for at least one scalable VDU included in the NS instance. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements. It should be noted that two blocks shown in succession in the above figures may, in fact, be executed substantially concurrently, or the blocks may sometimes be executed in the reverse order, depending upon the functionality involved.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a virtualized network function manager (VNFM) comprising:
    receiving, from a first network management entity, a first request for instantiating or changing a virtualized network function (VNF) instance, wherein the first request comprises scaling information for at least one scalable VNF deployment unit (VDU) included in the VNF instance and whether an instantiation based on the scaling information is supported by the VNF instance is indicated in an Instantiate VNF Operation Configuration; and instantiating or changing the VNF instance based on the scaling information.

2. The method according to claim 1, wherein the scaling information indicates a scaling level different from that indicated in a VNF descriptor (VNFD) of the VNF instance.

3. The method according to claim 1, wherein instantiating or changing the VNF instance based on the scaling information comprises:

sending, to a second network management entity, a second request for granting resources to the VNF instance, wherein the second request comprises the scaling information.

4. The method according to claim 2, wherein the scaling level indicated in the scaling information is above zero and below a maximum scaling level indicated in the VNFD of the VNF instance.

5. The method according to claim 2, wherein the scaling information comprises:

a first indicator indicating a scaling level of the VNF instance;

a second indicator identifying an aspect of scaling; and a third indicator identifying the VNFD of the VNF instance.

6. The method according to claim 3, wherein the first network management entity is a network function virtualization orchestrator (NFVO) and wherein the second network management entity is the NFVO.

7. The method according to claim 3, wherein the first network management entity is an element manager (EM) and wherein the second network management entity is a network function virtualization orchestrator (NFVO).

8. The method according to claim 1, wherein the first request is an Instantiate VNF Request or a Change VNF Flavour Request.

9. The method according to claim 3, wherein the second request is a Grant Request.

10. A method performed by a network management entity, comprising:

sending, to a virtualized network function manager (VNFM), a first request for instantiating or changing a virtualized network function (VNF) instance, wherein the first request comprises scaling information for at least one scalable VNF deployment unit (VDU) included in the VNF instance and whether an instantiation based on the scaling information is supported by the VNF instance is indicated in an Instantiate VNF Operation Configuration.

11. The method according to claim 10, wherein the scaling information indicates a scaling level different from that indicated in a VNF descriptor (VNFD) of the VNF instance.

12. The method according to claim 10, wherein the network management entity is an element manager (EM).

13. The method according to claim 10, wherein the network management entity is a network function virtualization orchestrator (NFVO).

14. The method according to claim 13, further comprising:

receiving, from the VNFM, a second request for granting resources to the VNF instance, wherein the second request comprises the scaling information.

15. The method according to claim 14, further comprising:

determining a grant for the VNFM based on the scaling information; and sending the grant to the VNFM.

16. A virtualized network function manager (VNFM) comprising:

at least one processor; and at least one memory, the at least one memory containing instructions which, when executed by the at least one processor, cause the VNFM to:

receive, from a first network management entity, a first request for instantiating or changing a virtualized network function (VNF) instance, wherein the first request comprises scaling information for at least one scalable VNF deployment unit (VDU) included in the VNF instance and whether an instantiation based on the scaling information is supported by the VNF instance is indicated in an Instantiate VNF Operation Configuration; and instantiate or change the VNF instance based on the scaling information.

17. A network management entity comprising:

at least one processor; and at least one memory, the at least one memory containing instructions which, when executed by the at least one processor, cause the network management entity to:

send, to a virtualized network function manager (VNFM), a first request for instantiating or changing a virtualized network function (VNF) instance, wherein the first request comprises scaling information for at least one scalable VNF deployment unit (VDU) included in the VNF instance and whether an instantiation based on the scaling information is supported by the VNF instance is indicated in an Instantiate VNF Operation Configuration.

* * * * *

UNITED STATES PATENT AND TRADEMARK OFFICE
CERTIFICATE OF CORRECTION

| | |
|---|---|
| PATENT NO. | : 12,034,609 B2 |
| APPLICATION NO. | : 18/249541 |
| DATED | : July 9, 2024 |
| INVENTOR(S) | : Zhou et al. |

It is certified that error appears in the above-identified patent and that said Letters Patent is hereby corrected as shown below:

On the Title Page

In Item (73), under "Assignee", in Column 1, Line 1, delete "Ericsson," and insert -- Ericsson (publ), --, therefor.

In the Specification

In Column 1, Line 52, delete "virtualized" and insert -- VNF --, therefor.

In Column 14, Line 50, delete "blow." and insert -- below. --, therefor.

Signed and Sealed this
Twenty-ninth Day of October, 2024

Katherine Kelly Vidal
*Director of the United States Patent and Trademark Office*